(12) United States Patent  
Gilbert et al.

(10) Patent No.: US 9,215,500 B2  
(45) Date of Patent: Dec. 15, 2015

(54) FULL-FRAME BUFFER TO IMPROVE VIDEO PERFORMANCE IN LOW-LATENCY VIDEO COMMUNICATION SYSTEMS

(71) Applicant: Lattice Semiconductor Corporation, Portland, OR (US)

(72) Inventors: Jeffrey M. Gilbert, Cupertino, CA (US); Ting-Kuo Lo, San Jose, CA (US); Peifeng Wu, San Jose, CA (US); Nishit Kumar, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 11 days.

(21) Appl. No.: 13/839,671

(22) Filed: Mar. 15, 2013

(65) Prior Publication Data

US 2014/0173680 A1    Jun. 19, 2014

Related U.S. Application Data

(60) Provisional application No. 61/738,288, filed on Dec. 17, 2012.

(51) Int. Cl.  
*H04N 7/173* (2011.01)  
*H04N 7/50* (2006.01)  
*H04N 21/44* (2011.01)  
*H04N 21/442* (2011.01)

(52) U.S. Cl.  
CPC ... *H04N 21/44004* (2013.01); *H04N 21/44209* (2013.01)

(58) Field of Classification Search  
CPC .......... H04N 21/44004; H04N 21/44209  
See application file for complete search history.

(56) References Cited

U.S. PATENT DOCUMENTS

| | | | |
|---|---|---|---|
| 2007/0160038 A1* | 7/2007 | Liu et al. | 370/389 |
| 2011/0235709 A1* | 9/2011 | Shi et al. | 375/240.12 |
| 2012/0230389 A1 | 9/2012 | Laurent et al. | |
| 2012/0230390 A1 | 9/2012 | Akkor | |

FOREIGN PATENT DOCUMENTS

| | | |
|---|---|---|
| WO | WO 2004/056057 A2 | 7/2004 |
| WO | WO 2012/113055 A1 | 8/2012 |

OTHER PUBLICATIONS

PCT International Search Report and Written Opinion, PCT Application No. PCT/US2013/068459, Feb. 25, 2014, 14 pages.

* cited by examiner

*Primary Examiner* — Rong Le  
(74) *Attorney, Agent, or Firm* — Fenwick & West LLP (57) ABSTRACT

Embodiments of apparatuses and methods to decrease a size of a memory in a low-latency video communication system are described. A control unit is configured to monitor a condition associated with at the communication link. The control unit is configured to receive the video content over a link based on monitoring. A memory comprising a full-frame buffer is coupled to the control unit. The full-frame buffer is configured as a history buffer to store a full frame of the video in a coding format that matches the coding format of the video content received over the link. A display unit is coupled to the history buffer. A portion of the full-frame buffer is configured as a network streaming buffer.

32 Claims, 9 Drawing Sheets

Prior Art

FIG. 1A

Prior Art

FIG. 7 ofDetectedarePS# FULL-FRAME BUFFER TO IMPROVE VIDEO PERFORMANCE IN LOW-LATENCY VIDEO COMMUNICATION SYSTEMS

PRIORITY

The present patent application claims priority to and incorporates by reference the corresponding provisional patent application Ser. No. 61/738,288, titled, "Full-Frame Buffer to Improve Video Performance in Low-Latency Video Communications Systems" filed on Dec. 17, 2012.

FIELD

At least some embodiments of the present invention generally relate to communication systems, and more particularly, to low-latency video communication systems.

BACKGROUND

Generally, transmitting media data from the input of a transmitter to the output of a receiver in wireless video communication systems throws numerous challenges, particularly with regards to concealing visible video artifacts under poor wireless-link conditions, wireless-link outages, and video-format changes.

Frame buffers are widely used in wired and wireless video communication systems. Traditionally, frame buffer (sometimes called frame-store) is defined to be the memory that drives a video display and contains a complete frame worth of video data. With the advent of video compression the definition of frame buffer has been expanded to include all the memory storage required for video decompression and post-processing steps before display. The post-processing steps could include video scaling, de-interlacing, frame-rate conversions, and other image enhancements. In the context of video communication systems there is a further need to buffer video data as it is received over the communication link and before video decompression. This is so that latencies and non-idealities associated with the link can be mitigated, and out-of-order packet arrivals can be reconciled. This buffer is sometimes called network streaming buffer or network buffer.

While the network buffer stores video content in a coding format matching the coding format of data received over the link, such is not the case with frame buffer. The frame buffer usually stores uncompressed video pixels to aid video decompression, and in some systems alternate coding schemes (such as, RLE (Run Length Encoding) or DPCM (Differential Pulse Code Modulation)) are employed to reduce bandwidth around the memory subsystem housing the frame buffer.

Figure 1A:
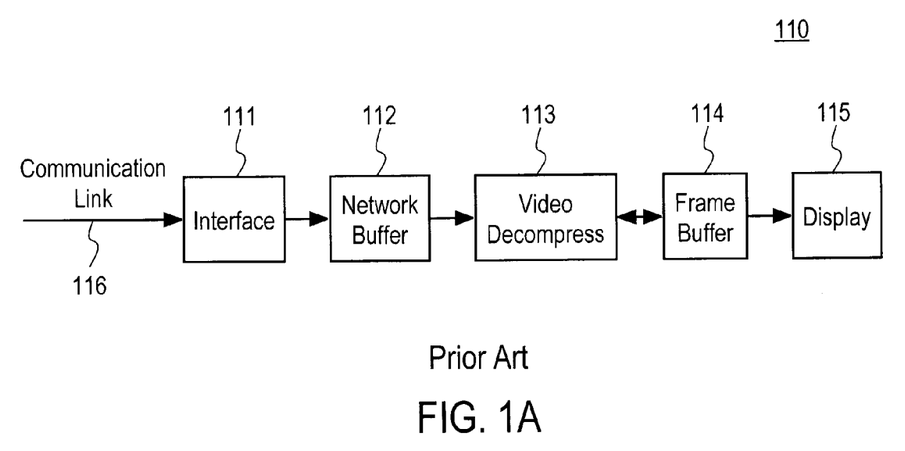
FIG. 1A illustrates the organization of a network buffer and a frame buffer within the pipeline of a typical video communication receiver system.

FIG. 1A illustrates the organization of a network buffer and a frame buffer within the pipeline of a typical video communication receiver system. As shown in FIG. 1A, a typical video communication receiver system 110 includes an interface 111, a network buffer 112, a video decompress unit 113, a frame buffer 114, and a display 115. The interface 111 receives compressed video data via a communication link 116. Multiple frames of the compressed video data are then buffered in the network buffer 112. The compressed video data stored in the network buffer 112 are sent to the video decompress unit 113. One frame of the uncompressed video data is then buffered in the frame buffer 114 for displaying on the display 115.

In typical video communication systems, the display is driven by a buffering pipeline that operates in a simple First-In-First-Out (FIFO) fashion. Data stored in the buffering pipeline is used to buffer video content required to be played out at a future time.

Figure 1B:
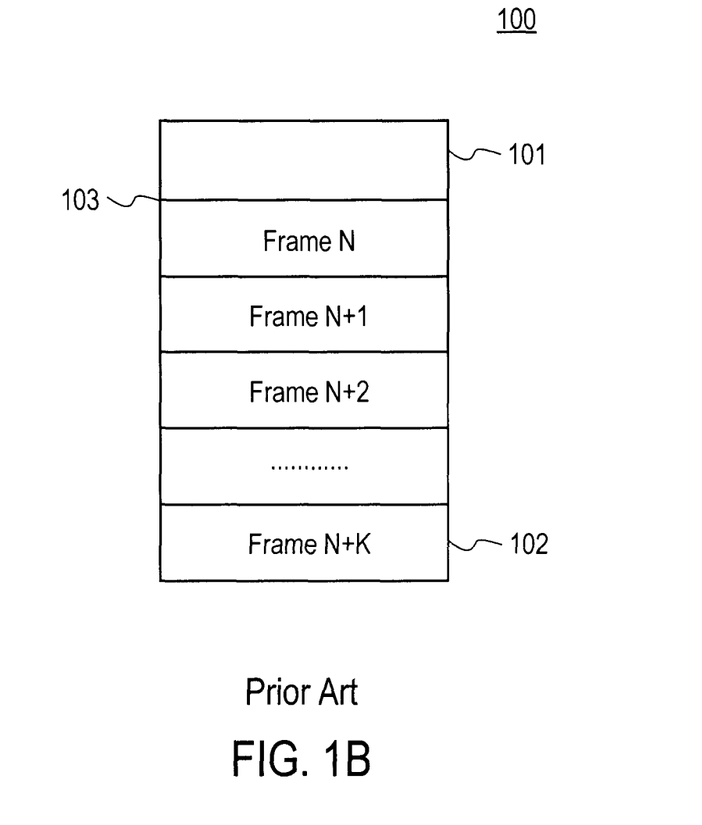
FIG. 1B illustrates a FIFO used in a typical wired or wireless video communication system.

FIG. 1B shows a schematic 100 illustrating a FIFO 101 used in a typical wired or wireless video communication system, such as system 110 depicted in FIG. 1A. As shown in FIG. 1B, FIFO 101 stores video frames N, N+1, N+2, . . . N+K, where N and K can be any number. As shown in FIG. 1B, while Frame N+K 102 is being written into FIFO 101, the Frame N 103 is being simultaneously read out for display. That is, the typical buffering scheme, such as shown in FIG. 1A, accumulates several frames of video before displaying. Generally, after a frame (e.g., Frame N) is displayed, it is discharged from the buffers. Because these buffers are large, they are often implemented as part of a larger and standalone memory subsystem (e.g., external SDRAM IC), outside of the wired or wireless receiver module.

SUMMARY OF THE DESCRIPTION

Embodiments of apparatuses and methods employing a small full-frame buffer memory in a low-latency video communication receiver system are described. In one embodiment, a control unit is configured to monitor conditions associated with a video communication link. The condition could also be a function of either a priori knowledge about the video content or computed properties of the video content. The control unit is configured to receive the video content over a link based on monitoring. A memory comprising a full-frame buffer is coupled to the control unit. In at least some embodiments, the full-frame buffer is configured as a history buffer to store a full frame worth of the video content in a coding format that matches the coding format of the video content received over the link. A display unit is coupled to the history buffer to display the video content. In at least some embodiments, a portion of the full-frame buffer is configured as a network streaming buffer.

Other features of the present invention will be apparent from the accompanying drawings and from the detailed description which follows.

BRIEF DESCRIPTION OF DRAWINGS

The embodiments as described herein are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention. Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Exemplary embodiments of methods and apparatuses to use a full-frame buffer (FFB) to improve video performance and/or reduce implementation cost and complexity in low-latency video communication receiver systems are described. Exemplary embodiments described herein address an efficient way of storing video data in a FFB that results in reducing the memory size implementing the FFB. In wireless video communication systems it is often desirable to have low-latency for video data from the input of a transmitter to the output of a receiver, e.g., fraction of a frame time. Design of such low-latency wireless video systems throws numerous challenges, particularly with regards to concealing visible video artifacts under poor wireless-link conditions, wireless-link outages, and video-format changes. Embodiments of methods and apparatuses of video buffering described herein address these challenges. In at least some embodiments, a video communication receiver system includes an inexpensive on-chip FFB to address these challenges, as described in further detail below.

Typically, the use of FFB is cost prohibitive for uncompressed video transmission. In at least some embodiments, a video communication system includes a FFB that stores coded video content (e.g., visually lossless 1× to 8× coding), as described in further detail below. It should be borne in mind that in the descriptions to follow the terms "coded" and "compressed" are used interchangeably and likewise the terms "uncoded" and "uncompressed" are used interchangeably.

Figure 2A:
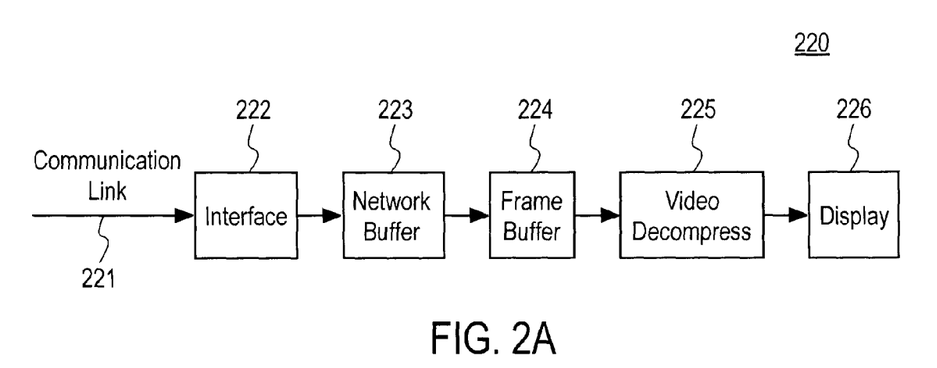
FIG. 2A illustrates an example of organization of a network buffer and a separate frame buffer within the pipeline of a video communication receiver system according to one embodiment of the invention.

FIG. 2A illustrates an example of organization of a network buffer and a separate frame buffer within the pipeline of a video communication receiver system according to one embodiment of the invention. A video communication system 220 includes an interface 222, a network buffer 223 followed by a frame buffer 224, a video decompress unit 225, and a display 226. In at least some embodiments, the network streaming buffer is smaller than the frame buffer. As shown in FIG. 2A, the interface 222 receives compressed video data via a communication link 221. The video data are compressed according to a certain coding format. As shown in FIG. 2A, compressed video data are buffered in the network buffer 223 to mitigate latencies and non-idealities associated with link 221. In at least some embodiments, frame buffer 224 stores a single frame of the compressed video data. In at least some embodiments, both network buffer 223 and frame buffer 224 store the compressed video data in a coding format that matches the coding format of the data received over link 221. The compressed frame of the video data from frame buffer 224 is provided to decompress unit 225 for displaying on the display 226. In at least some embodiments, the network buffer 223 stores only a fraction of the frame of the compressed video data, as described in further detail below.

Figure 2B:
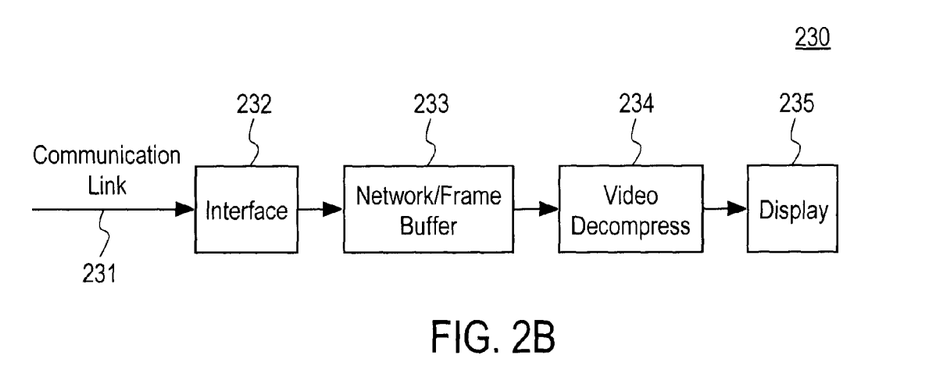
FIG. 2B illustrates an example of organization of a combined network buffer and frame buffer within the pipeline of a video communication receiver system according to another embodiment of the invention.

FIG. 2B illustrates an example of organization of a combined network buffer and frame buffer within the pipeline of a video communication receiver system according to another embodiment of the invention. In one embodiment, a video communication system 230 includes at least an interface 232, a combined buffer 233, a video decompress unit 234, and a display 235. The combined buffer 233 is a combination of a network buffer and a frame buffer, as described in further detail below. In at least some embodiments, the frame buffer is combined with the network buffer in the combined buffer to optimize the implementation.

As shown in FIG. 2B, interface 232 receives compressed video data via a communication link 231. The compressed video data are buffered in combined buffer 233 to mitigate latencies and non-idealities associated with link 231. In at least some embodiments, one frame of the compressed video data received via the link is stored in the frame buffer. In at least some embodiments, only a fraction of the frame of the compressed video data is stored in the network buffer. In at least some embodiments, both the frame buffer and the network buffer store the compressed video data in a coding format that matches the coding format of the data received over the link. The compressed frame of the video data from the combined buffer 233 is provided to decompress unit 234 for decompression for display on the display 235.

Unlike typical video communication systems, embodiments of the frame buffer and network buffer in the video communication systems described herein are organized differently. As shown in FIGS. 2A and 2B, the frame buffer, which stores a single frame worth of video data, is located ahead of the video decompress unit. In at least some embodiments, the network buffer stores only a small fraction of a video frame. In at least some embodiments, both the network buffer and the frame buffer store video content in the coding format that matches the coding format of content received over the communication link. In at least some embodiments, the combined network buffer and frame buffer is referred to as a full-frame buffer (FFB).

In at least some embodiments, the FFB is integrated within a video/audio pipeline of a wireless receiver containing a hardware Media Access Control (MAC) implementation. Unlike typical video communication systems, in which data passively passes through the buffering pipeline of the receiver, embodiments described herein use a method to intelligently and dynamically determine the specific video data to be stored in the FFB and the data to be output based on the link condition. In the descriptions to follow, the term "history data" is used to denote video data that has already been displayed at least once, and is stored for potential reuse to display under certain conditions, described herein. In at least some embodiments, history data is stored in the FFB. This usage of a frame buffer is in sharp contrast to typical systems where the buffering pipeline simply stores video data to be displayed at a future time. In at least some embodiments, history data is used to conceal video artifacts and enhance the perceived user experience, as described in further detail below.

Embodiments described herein are used in a Gen3 WirelessHD receiver chipset to improve video quality under challenging wireless link conditions and AV format changes. Embodiments described herein can be adapted and extended to WiGig/WiFi as well as wired video communication systems. Generally, WirelessHD (WiHD) and Wireless Gigabit (WiGig) refers to a multi-gigabit speed wireless communications technology operating over the 60 GHz frequency band.

Unless specifically stated otherwise, it is appreciated that throughout the description, discussions utilizing terms such as "processing", "computing", "monitoring", "receiving" "storing", "determining" "displaying", or the like, refer to the action and processes of a data processing system, or similar electronic processing device, that manipulates and transforms data represented as physical (electronic) quantities within the data processing system's registers and memories into other data similarly represented as physical quantities within the data processing system memories or registers or other such information storage, transmission or display devices.

Embodiments of the present invention relate to an apparatus for performing one or more of the operations described herein. This apparatus may be a hardware specially constructed for the required purposes, it may comprise a general purpose computer selectively activated or reconfigured by a computer program stored in the computer, or a combination thereof. A computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

Figure 2C:
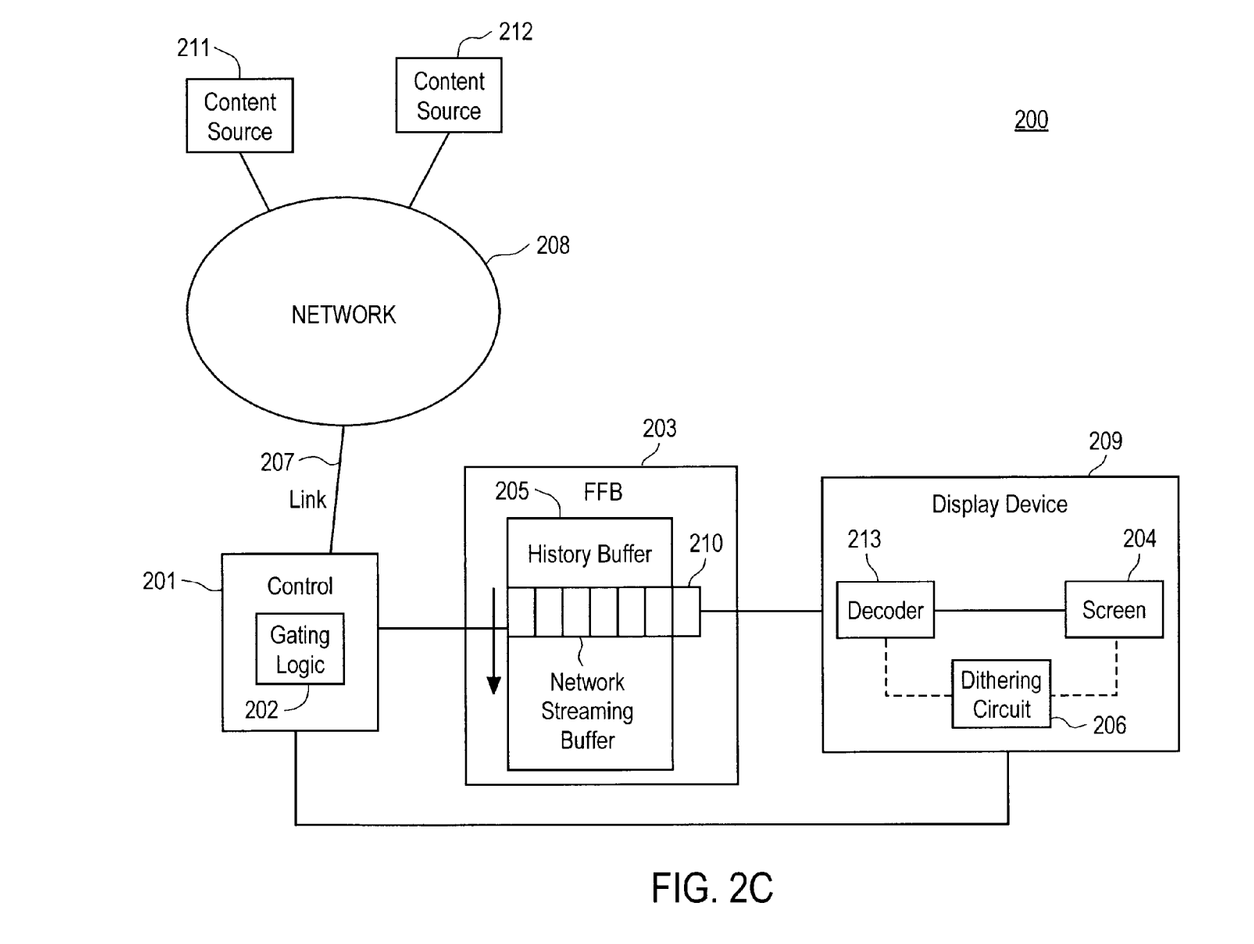
FIG. 2C shows a block diagram of a video communication system containing a small full-frame buffer (FFB) according to one embodiment of the invention.

FIG. 2C shows a block diagram 200 of a video communication receiver system containing a small full-frame buffer according to one embodiment of the invention. It includes a receiver control unit 201 to receive video content (e.g., packets of video/audio data) in a compressed form over a communication link 207. Communication link 207 can be, for example, a wireless link, a wired link, or a combination thereof. In at least some embodiments, the video content is received by control unit 201 from one or more video content sources, e.g., content sources 211 and 212, over a network 208. The video content source can be a server, a satellite, a broadcast station, a wireless access point, a mobile device, or any other content source. A memory comprising a full-frame buffer (FFB) 203 is coupled to control unit 201. In at least some embodiments, receiver control unit 201 is configured to monitor a condition associated with video communication link 207 and/or the video content.

In at least some embodiments, control unit 201 includes gating logic 202 that determines whether or not to write into FFB 203 the video content that was received over link 207 based on the condition(s) being monitored, as described in further detail below. In at least some embodiments, gating logic 202 includes e.g., a microcontroller, a field-programmable gate array (FPGA), or any other integrated circuit component to perform a logical function.

In at least some embodiments, full-frame buffer (FFB) 203 is configured as a history buffer 205 to store one full frame of coded video content in a coding format that matches the coding format of the video content received over the link. The coding format could be, for example, motion-JPEG, H.264, intra-frame coding, MPEG-2, MPEG-4, or any other compression algorithm. In one embodiment, the coding format of the video content stored in FFB 203 is a "slice-based" coding format that codes a predetermined number of complete lines of video data (e.g., 8, or any other number) at a time. In one embodiment, parts of the video content received by receiver control unit 201 are stored in a memory (e.g., a RAM, or any type of memory). In one embodiment, only a portion of the video content is allowed by control unit 201 to be written in FFB 203. In one embodiment, the video content stored in FFB 203 is organized using a list of pointers that help in efficient implementation of read, write, and delete operations associated with the memory.

In one embodiment, FFB 203 and control unit 201 are in the same semiconductor integrated circuit chip ("die"). Generally, a semiconductor chip refers to a small piece of a semiconducting material on which an integrated circuit is embedded.

For example, in one embodiment, FFB 203 and the wireless MAC device are located on the same die. In one embodiment, FFB 203 and control unit 201 are in the same multi-chip module (MCM) package. For example, in one embodiment, the history buffer is located on one die and the wireless MAC device is located on another die that are in a common MCM package. In one embodiment, the receiver unit, FFB, and the display unit are part of a portable transceiver incorporated into a mobile phone, pad, or other portable electronic device. In one embodiment, the coded video content stored in the FFB is for progressive video, interlaced video, 3D video, or any other video format.

In one embodiment, the FFB can be configured to store either one of progressive and interlaced video formats. In one embodiment, for interlaced video, odd and even fields are differentiated and stored separately in the FFB. In one embodiment, when the FFB is read out for the interlaced case, the selection for odd or even fields depends on the display field. In one embodiment, the FFB stores 3-D video content.

As shown in FIG. 2C, a display unit 209 is coupled to FFB 203. As shown in FIG. 2C, display unit 209 includes a video decoder 213 to decode the coded video content, a display device having a screen 204 to display the video content. In at least some embodiments, a dithering circuit 206 is coupled between the decoder 213 and display screen 209 to improve the quality of the reconstructed video image.

In at least some embodiments, the FFB stores at least a portion of the video content for display by the display unit 209, as described in further detail below. In at least some embodiments, a portion of FFB 203 is configured as a network streaming buffer 210 that operates as a current buffer to temporarily store the video content for display on the display device. Network streaming buffer 210 is used by the receiver control unit (e.g., a wireless MAC device) to allow for a packet assembly and retries. In one embodiment, the video content stored in the network streaming buffer is organized using a list of pointers that help in efficient implementation of read, write, and delete operations. In one embodiment, the network streaming buffer is configured to stitch packets of the received video content in a proper order to send out to a video decoder. In one embodiment, the packets are stitched based on a location on the screen of the display device. In one embodiment, the packets are stitched based on control information contained in the header of the packets received over link 207.

In one embodiment, the network streaming buffer is used by the receiver control unit (e.g., a wireless MAC device) to allow for robust operation under varying wireless link conditions. In one embodiment, the history buffer is shared with the network streaming buffer to provide an efficient and flexible implementation of the FFB memory in the communication system. In at least some embodiment, the history buffer and the network streaming buffer share the same memory to reduce system memory cost.

In at least some embodiments, the network streaming buffer, such as network streaming buffer 210 is configured to store portions of a frame of video for display on the display device at a future time, as described in further detail below. In at least some embodiments, the receiver control unit, such as control unit 201, is configured to dynamically adjust capacity ("cap") of at least one of the history buffer (e.g., buffer 205) and the network streaming buffer (e.g., buffer 210) based on a condition. In one embodiment, the caps for the history buffer and the streaming network buffer are dynamically adjustable to provide improved video quality. In one embodiment, the network streaming buffer cap is increased when the link condition is good, as described in further detail below. In one embodiment, the history buffer cap is increased when the link condition is bad, as described in further detail below.

In at least some embodiments, the receiver control unit, such as control unit 201 is configured to prevent the video content from being written into in the network streaming buffer, such as buffer 210, based on a condition being monitored. For example, the content arriving over a link (wireless, wired, or both) can be pro-actively dropped, when the arrival of those packets is late (i.e., out of the display window). This saves the capacity of the history buffer from being configured as the network streaming buffer. Dropping at least a portion of the arriving content packets to prevent it from being stored in the FFB can be used to increase the cap for the history buffer.

In at least some embodiments, at least one of a control unit (e.g., control unit 201) and a display unit (e.g., display unit 209) is configured to select one of the history buffer and network streaming buffer from which to output the video content for display on the screen ("Display Decision") based on a condition and/or time. In one embodiment, the condition is an indicator associated with the link. In one embodiment, the selection is made to read out the video content from the history buffer instead of the network streaming buffer to improve video being displayed. In one embodiment, the "Display Decision" switches intelligently and dynamically between the history buffer and the network streaming buffer based on instantaneous wireless link condition indicators (e.g., signal-to-noise ratio ("SNR") or ACK-NACK statistics). Generally, ACK refers to the acknowledgment signal sent by a receiving station (destination) back to a sending station (source) after successfully receiving a recognizable block of data of a specific size. NACK refers to a negative acknowledgment signal sent by the receiving station when, for example, the data are received with errors. In one embodiment, the "Display Decision" switches intelligently between the history buffer and the network streaming buffer based on the amount of data received for a display region on the screen.

In one embodiment, the FFB maintains video display when the over-the-air link is very poor (e.g., link outage). This can be achieved, for example, by completely blocking writes to the network streaming buffer, and reading out content only from the history buffer.

In one embodiment, a change in video format is the condition used to determine whether to select either the history buffer or the network streaming buffer from which to read out data for display. For example, the history buffer can be used to display the video content to enhance the user experience during a video format change. During the transition from one video format to another, the transmitter and receiver may be out of synchronization with regards to knowledge about the video format. In those transitions, the history buffer can be used to reduce display artifacts. This is achieved by blocking out writes into the network streaming buffer, and playing the video from history buffer as much as possible. The history buffer stores content in the older video format.

In one embodiment, the condition used to determine whether to select the history buffer or the network streaming buffer from which to read out data for display is the amount of the video content stored in the network streaming buffer. This is an instantaneous indicator of the link condition. For example, if the amount of the video content stored in the network streaming buffer is less than a certain amount, the video content is played out of the history buffer, and if the amount of the video content stored in the network streaming buffer is greater than a certain amount, the video content is played out only from the network streaming buffer. In one embodiment, if video content is received late (i.e., out of display window), the history buffer can be used to provide data for display.

In at least some embodiments, data from the history buffer is not used for display and the history buffer has no bearing on display pipeline latency. In at least some embodiments, data from the current buffer is used for display and therefore the current buffer has bearing on display pipeline latency. In at least some embodiments, when the link conditions are bad and/or the current buffer has inadequate content, then the data from the history buffer are used for display.

In one embodiment, the FFB is configured to operate in uncompressed mode. In uncompressed mode, the FFB can be employed to store history data for less-demanding video formats (e.g., 480 p/60 Hz) or Most Significant Bits (MSBs) of video pixels (e.g., most significant 6 bits out of each 8-bit RGB component of a video pixel) for video formats that are more demanding (e.g., 1080 p/60 Hz). The FFB, configured as the described herein, can be used to operate in an uncompressed mode and store video data for less-demanding video formats. As an example, history buffer designed to handle 1920×1080 video format in compressed mode with compression ratio 2 can be employed to store an entire frame of 720×480 video format in uncompressed mode.

In one embodiment, the history buffer as described herein can be used to operate in an uncompressed mode to store a history of demanding formats, but only store most significant bits (MSBs) of video pixels. As an example, history buffer designed to handle a 1920×1080 and 24 bits-per-pixel video format in compressed mode and a compression ratio of 1.5 can be employed to store 1920×540 and 24 bits-per-pixel video format, while omitting selected bits out of the 24-bit pixel. A 24-bit pixel comprises three 8-bit components for R (red), G (green) and B (blue), and in this example, only 6 MSBs, for example, for each of the three 8-bit components can be stored and with the remaining 2 bits being dropped.

In one embodiment, the history buffer is configured to operate in uncoded mode and to store more data for luma component than data for chroma components. Generally, a luma component represents the brightness in an image, while chroma components represent color information.

In one embodiment, the history buffer is configured to store a locally generated coded frame. For example, the history buffer configured as described herein can be employed to store a locally-generated coded frame, which for example, can be used to generate splash screens that appear on a display upon powering-on a receiver unit, without necessarily an association with a video content source.

In one embodiment, a control unit (e.g., control unit 201) stores the video content in FFB at a reduced frame rate, as compared to the frame rate of the received video content. In one embodiment, a control unit (e.g., control unit 201) stores the video content in the full-frame buffer based on detecting changing regions in the received video content. For example, the FFB as described herein can be employed to save system-power by storing video frames for only a subset of frames or a subset of regions in a frame. For the periods when incoming data from the communication link are not-interesting (e.g., frames are not changing), all the up-stream blocks can be turned off during that period (e.g., wired or wireless PHY, wireless radio), and the missing frames or portions of a frame can be reconstructed using content from the history buffer.

In one embodiment, the decision whether or not to store a frame in the FFB is determined by a frame-rate reduction goal. As an example, for 60 Hz frame-rate, the FFB is employed to store video frames at only 30 Hz. Each frame stored in the FFB is used twice for display. In one embodiment, the decision to write video data in FFB is determined by detecting "changing" versus "static" regions in a video frame. An example would be video content for picture-in-picture (PIP), where one video plane is relatively static. In such a case, the control unit in that case would either know the PIP configurations a priori or would need to detect boundaries of the static video plane and prevent storing the corresponding video data in the FFB. In one embodiment, the control unit occasionally re-computes the boundaries of the static video plane so that changes in the PIP configuration are addressed correctly.

As shown in FIG. 2C, dithering reconstruction circuit 206 is located between decoder 213 and display device 204 and is used to improve image quality. For example, in situations when the communication link is poor, only a portion of the coded video content is successfully transmitted to the receiver. In such a situation, the video image is reconstructed using the incomplete available data in the receiver and suffers loss of detail. A dithering reconstruction circuit (e.g., dithering reconstruction circuit 206) after the decoder (e.g., decoder 213) can be used to improve video quality in those situations.

Figure 3:
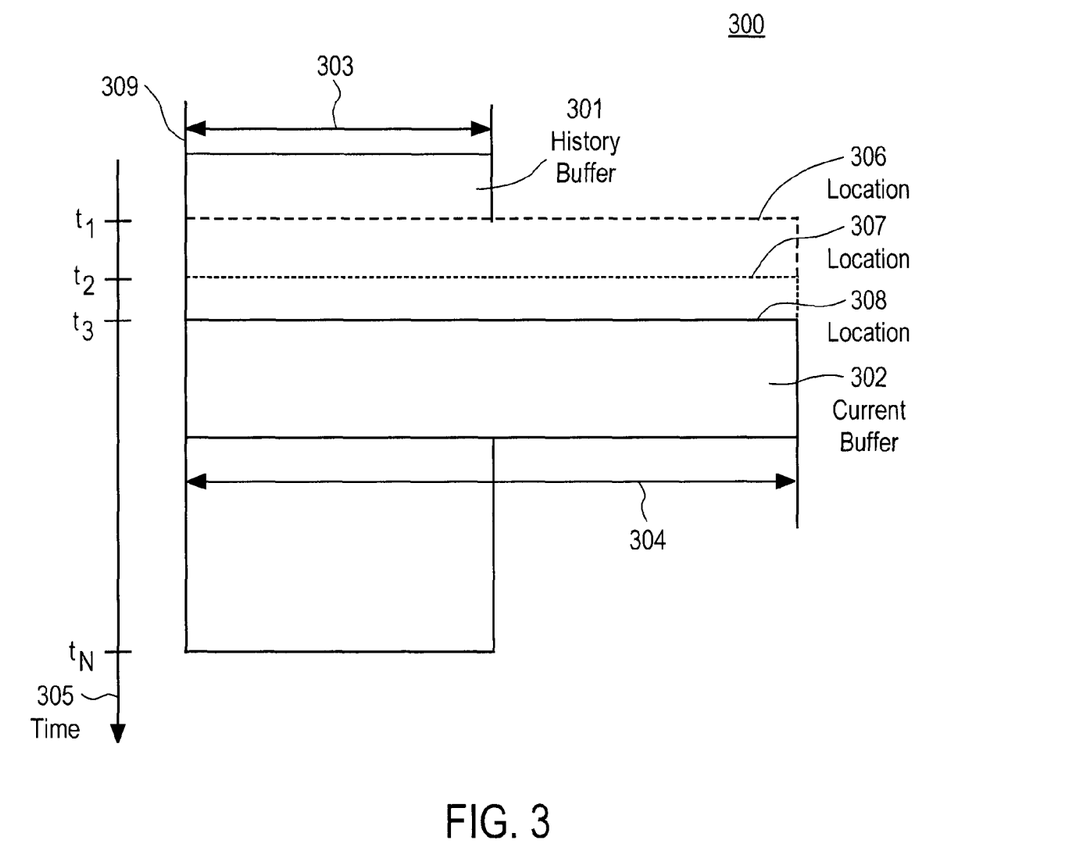
FIG. 3 shows a simultaneous use of FFB as history and current buffer according to one embodiment of the invention.

FIG. 3 shows a simultaneous use of FFB as history and current buffer according to one embodiment of the invention. FFB 300 includes a history buffer 301. History buffer 301 stores one full frame of video content in compressed form in a coding format that matches the coding format of the video content received over the link. As shown in FIG. 3, at least a portion of the FFB 300 is used as a network streaming buffer (shown as current buffer 302). The network streaming buffer is used to temporarily store the video content for display on the display device. In one embodiment, FFB 300 is configured to store one full frame of video content with the coding format matching the over-the-air coding format.

In one embodiment, the history and current buffer capacities are dynamically adjusted based on a link quality and the video format. Either the history buffer or the current buffer is selected to provide the stored video content for display based on the quality of coded video stored in the buffers, instantaneous wireless link conditions, or both. For example, if the link condition is not good (e.g., lower than a threshold), the receiver control unit (e.g., unit 201) automatically switches from the current buffer to the history buffer to display the video content, and the received content is prevented from being stored in the current buffer.

That is, the FFB combines two types of buffering, e.g., full-frame buffering for storing the data previously displayed, and network streaming buffering for storing the data for display at a current time. In one embodiment, as video data packets come in over the communication link, they are stored in the FFB's current buffer. The encoded content from the current buffer is read out as an input to a decoder (e.g., decoder 213) that decodes the received encoded content to display on a display device (e.g., display device 204). In one embodiment, while the video content from the current buffer is read out for display on the display device, the video content is stored in the history buffer for a future use. In one embodiment, a portion of the current buffer becomes a history buffer at a time in the future.

As shown in FIG. 3, current buffer 302 is moved through the history buffer 301 as time 305 progresses. As shown in FIG. 3, at time $t_1$ an edge of current buffer 302 is at a location 306 (dotted line). At time $t_2$ an edge of current buffer 302 is at a location 307 (dashed line). At time $t_3$ current buffer 302 is at a location 308 (solid line) over history buffer 301. At time $t_N$, when the current buffer 302 reaches an edge of the history buffer, the current buffer is rolled back (wraps around) to a top 309 of the history buffer 301. In one embodiment, the current buffer is moved through the history buffer in synchronization with a displayed picture. In one embodiment, the video data is written in memory only once when the memory operates as a current buffer, and only a portion of the current data is retained in the memory for use as history data. There is no need to store the video data again. In at least some embodiments, the portion of the FFB where the portion of the data that is no longer needed (i.e., data to be discarded) is stored is released for re-use when the current buffer becomes the history buffer.

In one embodiment, the history buffer stores video content with a level of detail that is less than the detail of video content stored in the current buffer. A measure of detail would be, for example, bits per line. As shown in FIG. 3, the width 303, representing bits-per-line for history buffer, is smaller than the width 304, representing bits-per-line for the current buffer. Such an embodiment helps optimize the size of the FFB. While the history buffer stores data for a full video frame, the current buffer only contains a fraction of a frame. Therefore, storing less detail in the history buffer as compared to the current buffer is an effective method for providing a small memory size. In one embodiment, storing video content in the history buffer involves discarding or no longer using details of video content stored in the current buffer. For an effective implementation of such an embodiment, the underlying video compression method lends itself to segregate different levels of detail in a compressed video stream, easily. An example of such a compression method would process each bit-plane of video-pixels separately. In the compressed video stream, data corresponding to different bit-planes are ordered, in, for example, most significant bit-plane to least significant bit-plane, and different bit-planes may be discarded (e.g., discard the 2 least significant bit-planes which represents compressed video stream data corresponding to the 2 least significant bits of video pixels). In such a scheme, the video detail can be easily manipulated for FFB. The details disregarded for history buffer would be data corresponding to least significant bit-planes.

In one embodiment, for a given portion of a display screen, the video content displayed from the history buffer has fewer bytes per line (lower quality) than the video content displayed from the current buffer (higher quality). In one embodiment, when the communication link condition is good, the video data from the current buffer (higher quality) is displayed. In one embodiment, when the link condition is bad, the video data from the history buffer (lower quality) is displayed.

In one embodiment, a capacity of each of the history buffer and the network streaming buffer is adjusted based on the condition of the link. For example, in one embodiment, if the link is good, the size of the current buffer 302 is increased at the expense of the history buffer 301, and, if the link is bad, the size of the history buffer 301 is increased at the expense of the current buffer.

Figure 4:
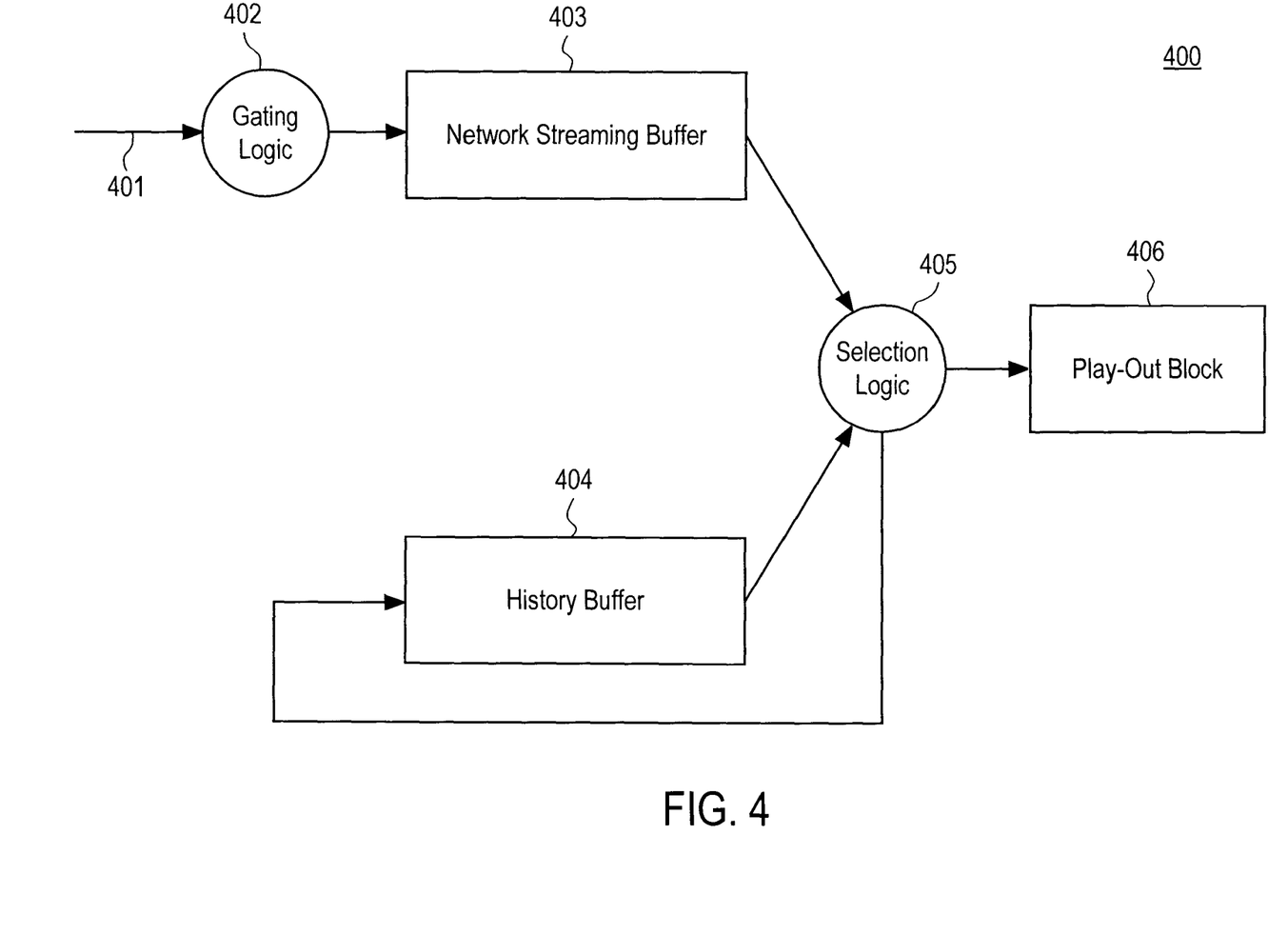
FIG. 4 shows a block diagram of logic surrounding FFB according to one embodiment of the invention.

FIG. 4 shows a block diagram of apparatus 400 containing logic of the FFB according to one embodiment of the invention. A gating logic 402 receives incoming video content data 401 over a communication link. Gating logic 402 monitors conditions associated with received content as well as that with the communication link. Gating logic 402 allows the video content data to pass through based on the condition(s). In one embodiment, the video content is prevented from being stored by gating logic 402 based on the condition(s). In at least some embodiments, the conditions include one or more of the following: an indicator associated with the link, a change in the coding format, an amount of the video content (also reflecting link condition), and whether the video content is received out of a display window (reflecting link condition), as described herein.

After passing through gating logic 402, the video data are stored in a compressed coding format that matches the coding format of the video data received over the communication link. This buffer is configured as a network streaming (current) buffer 403 to temporarily store the video content for display on the display device. Selection logic 405 (e.g., incorporated into a display unit 209) reads out the video content from the network streaming buffer to a play-out block 406. Play out block 406 can be, for example, a display device 204 shown in FIG. 2C. While the video content from current buffer 403 is displayed by play-out block 406, the video content is written into history buffer 404. In one embodiment, the video content is written into history buffer 404 by discarding a portion of the video content in the current buffer. In one embodiment, the network streaming (current) buffer stores video data with an associated list of pointers to the video data. In one embodiment, the video content is written into history buffer 404 by discarding (or ignoring) (e.g., retiring) a portion of the video content in the current buffer so that discarded content helps in releasing memory for re-use.

In at least some embodiments, history buffer 404 is selected by selection logic 405 based on the condition to provide the previously stored video content for display on the display device. In one embodiment, the selection decision to display video content from the current buffer or the history buffer is made according to one or more of the following factors: 1) a link quality indication from the gating logic (e.g., if the gating logic is blocking the incoming video stream, the history buffer is selected; otherwise the current buffer is selected); 2) validity of incoming compressed video data (e.g., if a slice of the incoming compressed video data is corrupted, the history buffer is selected); 3) availability (e.g., if originally selected buffer is empty, the other buffer is selected instead).

In one embodiment, a capacity of each of the history buffer and the network streaming buffer (current buffer) is adjusted based on the condition. In one embodiment, the video content is stored in the history buffer 404 at a reduced frame rate, as described herein. In one embodiment, the writes to history buffer 404 are enabled only based on detecting changing regions in the received video content. In one embodiment, the history buffer stores video content in uncoded mode, as described herein. These would be for less-demanding video formats or Most Significant Bits (MSBs) of more-demanding video formats, as described herein. In one embodiment, the video content stored in uncoded form in the history buffer contains more luma data than chroma data, as described herein. In at least some embodiments, the history buffer can be employed to store a locally generated coded frame, as described herein.

Figure 5:
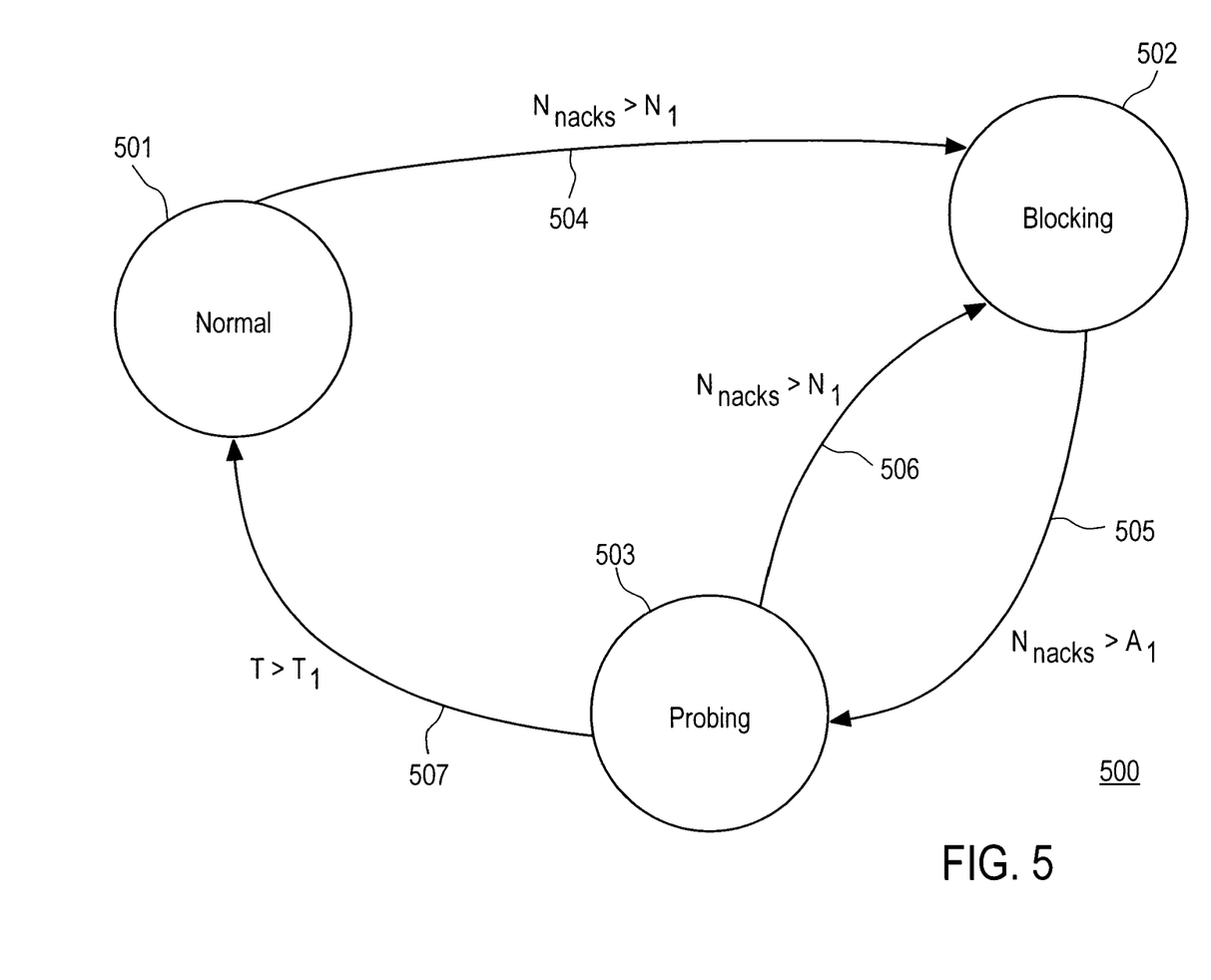
FIG. 5 shows a state diagram of the gating logic for FFB according to one embodiment of the invention.

FIG. 5 shows a state diagram 500 of a gating logic for FFB according to one embodiment of the invention. In one embodiment, whether to allow the incoming video packet to be written into the FFB or not is controlled by a hardware state machine. As shown in FIG. 5, a hardware state machine has a Normal (initial) state 501, a Probing state 503, and a Blocking state 502. In Normal state 501, the gating logic allows all incoming video packets to be written into the FFB. In one embodiment, a transition 504 from Normal state 501 to Blocking sate 502 is triggered by a programmable number ($N_1$) of consecutive sub-packets with CRC errors (or NACKs), which is an indication of a bad link. In one embodiment, the gating logic transitions from the Normal state to the Blocking state, if the number of the NACKs ($N_{nacks}$) is greater than a predetermined number $N_1$. In the Blocking state 502, the gating logic starts to prevent all incoming video stream packets from entering the FFB when the state machine exits the Normal state 501. In one embodiment, transitions 505 and 506 between Blocking state 502 and Probing state 503 are determined by the link quality. In one embodiment, if there is a programmable number of consecutive sub-packets with no CRC errors (or ACKs), which is an indication of a good link, transition 505 occurs and the Probing state 503 is entered. In one embodiment, the gating logic transitions (505) from the Blocking state 502 to the Probing state 503, if the number of the ACKs ($N_{acks}$) is greater than a predetermined number $A_1$. In one embodiment, if the number of consecutive sub-packets with CRC errors is greater than a predetermined number $N_1$, the gating logic transitions (506) from Probing state 503 back to Blocking state 502. In Probing state 503, if for a period of time T greater than a programmable time $T_1$ the state machine does not detect a bad link, the state machine returns to Normal state 501. Once Normal state 501 is entered, the gating logic starts to allow incoming video stream into FFB again.

Figure 6:
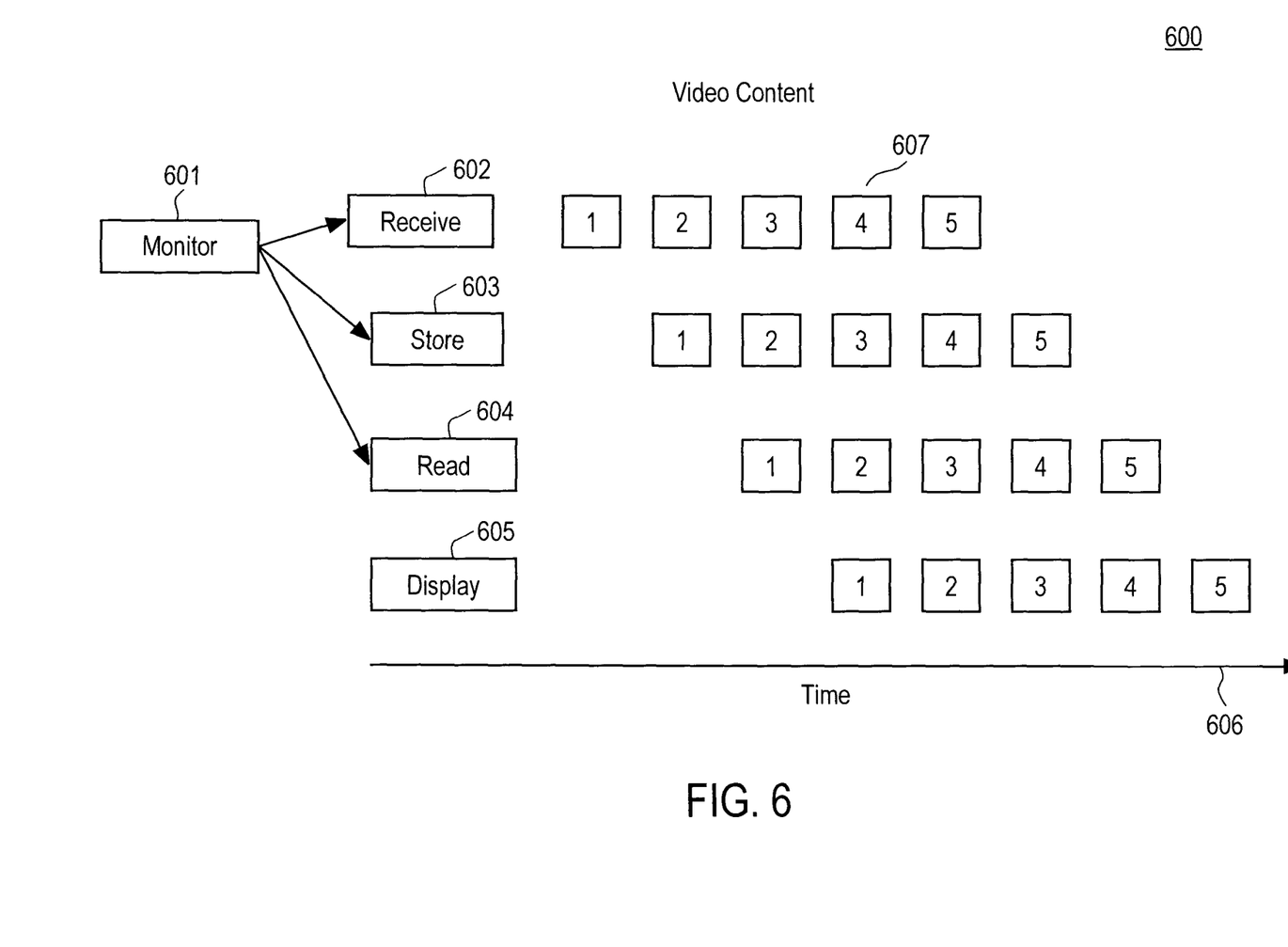
FIG. 6 shows a timing diagram of video data propagating through the pipeline of a video communication receiver system according to one embodiment of the invention.

FIG. 6 shows a timing diagram 600 of video data propagating through the pipeline of a video communication receiver system according to one embodiment of the invention. A condition associated with an incoming video content is monitored (block 601), as described herein. Video content 607 is received over a link based on the monitoring that is occurring (block 602), as described herein. As shown in FIG. 6, the video content 607 includes a stream of packets 1, 2, 3, 4, 5 that arrive along a time line 606. Each packet carries portion of the video frame in coded form.

At block 603, the video content is stored in a coding format that matches the coding format of the video content received over the link. As shown in FIG. 6, while a packet 2 is received, a packet 1 is stored in the full-frame buffer configured as a network streaming buffer and a history buffer, as described herein. In one embodiment, the video content is prevented from being stored in the network streaming buffer based on a condition, as described herein.

At block 604, the content is read out from either the history buffer or the network streaming buffer, as described herein. As shown in FIG. 6, while a packet 3 is received, packet 2 is stored in the full-frame buffer configured as the network streaming buffer and the history buffer, and packet 1 is read out from either of the history buffer or the network streaming buffer, as described herein.

At block 605, the content from either the history buffer or the network streaming buffer is displayed on a display device, as described herein. As shown in FIG. 6, while a packet 4 is received, packet 3 is stored in the full-frame buffer configured as the network streaming buffer and the history buffer, packet 2 is read out from one of the history buffer and the network streaming buffer, and packet 1 from the one of the history buffer and the network streaming buffer is displayed on a display device, as described herein. In one embodiment, one of the history buffer and the current buffer is selected to display the video content on the display device based on the condition, as described herein.

Figure 7:
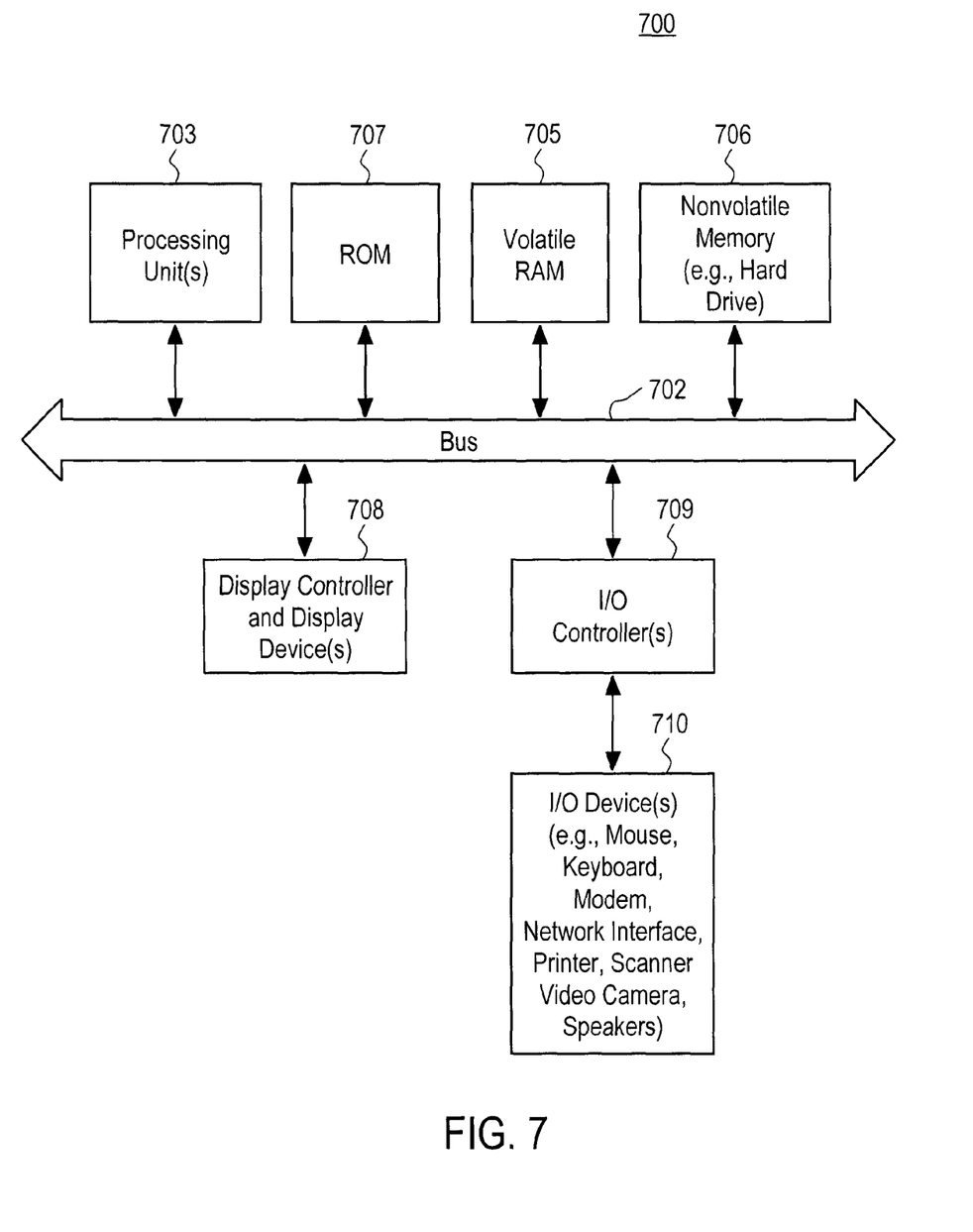
FIG. 7 shows one example of a data processing system which may be used with the embodiments of the present invention.

FIG. 7 shows one example of a data processing system which may be used with the embodiments of the present invention. Note that while FIG. 7 illustrates various components of a computer system, it is not intended to represent any particular architecture or manner of interconnecting the components as such details are not germane to the embodiments of the present invention. It will also be appreciated that network computers and other data processing systems which have fewer components or perhaps more components may also be used with the embodiments of the present invention.

Generally, a network refers to a collection of computers and other hardware components interconnected to share resources and information. Networks may be classified according to a wide variety of characteristics, such as the medium used to transport the data, communications protocol used, scale, topology, and organizational scope. Communications protocols define the rules and data formats for exchanging information in a computer network, and provide the basis for network programming. Well-known communications protocols include Ethernet, a hardware and link layer standard that is ubiquitous in local area networks, and the Internet protocol (IP) suite, which defines a set of protocols for internetworking, i.e. for data communication between multiple networks, as well as host-to-host data transfer e.g., Transmission Control Protocol (TCP), and application-specific data transmission formats, for example, Hypertext Transfer Protocol (HTTP). Methods and apparatuses to provide time markers for a packet stream described herein can be used for any of networks, protocols, and data formats.

As shown in FIG. 7, the data processing system 700, which is a form of a data processing system, includes a bus 702 which is coupled to one or more processing units 703, a ROM 707, volatile RAM 705, and a non-volatile memory 706. One or more processing units 703 may include, for example, a G3 or G4 microprocessor from Motorola, Inc. or IBM, may be coupled to a cache memory (not shown) or may include a network processor implemented in a field-programmable gate array (FPGA). The bus 702 interconnects these various components together and also interconnects these components 703, 707, 705, and 706 to a display controller and display device(s) 708 and to peripheral devices such as input/output (I/O) devices which may be mice, keyboards, modems, network interfaces, printers, scanners, video cameras, speakers, and other devices which are well known in the art. Typically, the input/output devices 710 are coupled to the system through input/output controllers 709. The volatile RAM 705 is typically implemented as dynamic RAM (DRAM) which requires power continually in order to refresh or maintain the data in the memory. The non-volatile memory 706 is typically a magnetic hard drive or a magnetic optical drive or an optical drive or a DVD RAM or other type of memory systems which maintain data even after power is removed from the system. Typically, the non-volatile memory will also be a random access memory although this is not required. In at least some embodiments, data processing system 700 includes a power supply (not shown) coupled to the one or more processing units 703 which may include a battery and/or AC power supplies.

While FIG. 7 shows that the non-volatile memory is a local device coupled directly to the rest of the components in the data processing system, it will be appreciated that the embodiments of the present invention may utilize a non-volatile memory which is remote from the system, such as a network storage device which is coupled to the data processing system through a network interface such as a modem or Ethernet interface. The bus 702 may include one or more buses connected to each other through various bridges, controllers and/or adapters as is well known in the art. In one embodiment the I/O controller 709 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 707, volatile RAM 705, non-volatile memory 706, or a remote storage device. In various embodiments, hardwired circuitry may be used in combination with software instructions to implement embodiments of the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by one or more processing units 703, e.g., a microprocessor, a field-programmable gate array (FPGA) and/or a microcontroller.

A machine readable medium can be used to store software and data which when executed by a data processing system causes the system to perform various methods of the present invention. This executable software and data may be stored in various places including for example ROM 707, volatile RAM 705, and non-volatile memory 706 as shown in FIG. 7. Portions of this software and/or data may be stored in any one of these storage devices.

Thus, a machine readable medium includes any mechanism that provides (i.e., stores and/or transmits) information in a form accessible by a machine (e.g.; a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods and apparatuses of the present invention can be implemented using a dedicated hardware (e.g., using Field Programmable Gate Arrays (FPGAs), Application Specific Integrated Circuit (ASIC) or shared circuitry (e.g., microprocessors or microcontrollers under control of program instructions stored in a machine readable medium). The methods of the present invention can also be implemented as computer instructions for execution on a data processing system, such as system 700 of FIG. 7.

In the foregoing specification, embodiments of the invention have been described with reference to specific exemplary embodiments thereof. It will be evident that various modifications may be made thereto without departing from the broader spirit and scope of the embodiments of the invention. The specification and drawings are, accordingly, to be regarded in an illustrative sense rather than a restrictive sense.

What is claimed is:

1. A receiver apparatus to store a video content in a video communication system, comprising:
   a control unit to monitor a condition, the condition indicative of an instantaneous quality of a video communication link based on at least one of a video communication link and the video content, the control unit configured to receive the video content via an encoded data stream over the link based on the monitoring;
   a full-frame buffer coupled to the control unit to store a frame of the video content in a coding format that matches the coding format of the video content received over the link;
   a history buffer to store at least a portion of the video content already displayed; and
   a display unit, coupled to the history buffer and the full-frame buffer, to display video content from the full-frame buffer and the history buffer, selective upon the condition monitored by the control unit, wherein the display unit comprises a decoder which decodes encoded video data.

2. The apparatus of claim 1, wherein a portion of the full-frame buffer is configured as a network streaming buffer, wherein the network streaming buffer is configured to temporarily store the video content to display on the display device.

3. The apparatus of claim 2, wherein the control unit prevents the video content from being stored in the network streaming buffer based on the condition.

4. The apparatus of claim 2, wherein the control unit stores more bits per line in the network streaming buffer than in the history buffer.

5. The apparatus of claim 1, wherein at least two of the history buffer, the full frame buffer, and the control unit are on the same die.

6. The apparatus of claim 1, wherein at least two of the history buffer, the full-frame buffer, and the control unit are in the same package.

7. The apparatus of claim 1, wherein the video content is at least one of: a progressive video, an interlaced video, and a 3D video.

8. The apparatus of claim 1, wherein the control unit dynamically adjusts a capacity of at least one of the history buffer and the full-frame buffer based on the condition.

9. The apparatus of claim 1, wherein the condition is one or more of the following: an indicator associated with the communication link, and a change in video format of the video content.

10. The apparatus of claim 1, wherein the control unit determines whether to store the video content in the full-frame buffer based on a frame rate of the video content being received.

11. The apparatus of claim 1, wherein the control unit stores the video content in the full-frame buffer based on detecting regions changing in the video content being received.

12. The apparatus of claim 1, wherein the history buffer is further configured to operate in an uncompressed mode to store a history of at least one of: less-demanding video formats, and Most Significant Bits (MSBs) of demanding formats.

13. The apparatus of claim 1, wherein the history buffer is further configured to operate in an uncoded mode to store more luma components than chroma components of the video content being received.

14. The apparatus of claim 1, wherein the history buffer is further configured to store a locally generated frame to generate a splash screen upon power-on.

15. The apparatus of claim 1, wherein the decoder is coupled to a dithering reconstruction circuit, which dithers video data, output by the decoder, responsive to the condition of the control unit.

16. A method to store video content in a video communication system, comprising:
    monitoring a condition indicative of an instantaneous quality of a video communication link;
    receiving the video content over the link based on the monitoring;
    storing, in a full-frame buffer, at least one frame of the video content in a coding format that matches the coding format of the video content received over the link;
    storing at least a portion of the video content already displayed in a history buffer; and
    displaying the stored video content from the full-frame buffer and the history buffer, selective upon the condition.

17. The method of claim 16, wherein a portion of a full-frame buffer comprises a network streaming buffer, and wherein the network streaming buffer is configured to temporarily store the video content to display on the display device.

18. The method of claim 17, further comprising:
    preventing the video content from being stored in the network streaming buffer based on the condition.

19. The method of claim 17, wherein more bits per line are stored in the network streaming buffer than in the history buffer.

20. The method of claim 16, further comprising:
    dynamically adjusting a capacity of the history buffer based on the condition.

21. The method of claim 16, further comprising:
    selecting video content from the history buffer to display on the display device based on the condition.

22. The method of claim 21, wherein the condition is one or more of the following: an indicator associated with the link, and change in the coding format.

23. The method of claim 16, wherein storing the video content in the full-frame buffer is based on one or more of: a frame rate of the received video content, and detecting regions in the video content that are changing.

24. The method of claim 16, further comprising:
    storing a history of at least one of uncoded less-demanding video formats, Most Significant Bits (MSBs) of demanding formats in the history buffer.

25. The method of claim 16, further comprising:
    storing an uncoded form more luma's components than chroma's components of the video content in the history buffer.

26. The method of claim 16, further comprising storing a locally generated coded frame in the history buffer.

27. The method of claim 16, further comprising: reconstructing at least a portion of the encoded video content.

28. A non-transitory machine readable storage medium that has stored instructions which when executed cause a data processing system to perform operations comprising:
   monitoring a condition indicative of an instantaneous quality of a video communication link;
   receiving the video content over the link based on the monitoring;
   storing, in a full-frame buffer, at least one frame of the video content in a coding format that matches the coding format of the video content received over the link;
   storing at least a portion of the video content already displayed in a history buffer; and
   displaying the stored video content from the full-frame buffer and the history buffer, selective upon the condition.

29. The non-transitory machine readable storage medium of claim 28, further comprising instructions which when executed cause the data processing system to perform operations comprising:
   configuring a portion of a full-frame buffer as a network streaming buffer, wherein the network streaming buffer is configured to temporarily store the video content for display on the display device.

30. The non-transitory machine readable storage medium of claim 29, further comprising instructions which when executed cause the data processing system to perform operations comprising:
   preventing the video content from being stored in the network streaming buffer based on the condition.

31. The non-transitory machine readable storage medium of claim 29, wherein more bits per line are stored in the network streaming buffer than in the history buffer.

32. The non-transitory machine readable storage medium of claim 28, further comprising instructions which when executed cause the data processing system to perform operations comprising:
   selecting the history buffer from which to obtain the video content for display on the display device based on the condition.

* * * * *